(12) United States Patent
Lee et al.

(10) Patent No.: US 11,468,312 B2
(45) Date of Patent: Oct. 11, 2022

(54) MEMORY MANAGEMENT FOR MACHINE LEARNING TRAINING ON GPU

(71) Applicant: Samsung Electronics Co., Ltd., Suwon-si (KR)

(72) Inventors: Joo Hwan Lee, San Jose, CA (US); Yang Seok Ki, Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1221 days.

(21) Appl. No.: 15/948,706

(22) Filed: Apr. 9, 2018

(65) Prior Publication Data

US 2019/0244096 A1 Aug. 8, 2019

Related U.S. Application Data

(60) Provisional application No. 62/625,530, filed on Feb. 2, 2018.

(51) Int. Cl.
*G06N 3/08* (2006.01)
*G06F 3/06* (2006.01)
*G06T 1/20* (2006.01)
*G06T 1/60* (2006.01)

(52) U.S. Cl.
CPC ............. *G06N 3/08* (2013.01); *G06F 3/0604* (2013.01); *G06F 3/0638* (2013.01); *G06F 3/0683* (2013.01); *G06T 1/20* (2013.01); *G06T 1/60* (2013.01)

(58) Field of Classification Search
CPC .......... G06N 3/08; G06N 3/063; G06N 3/084; G06N 20/00; G06F 3/0604; G06F 3/0638; G06F 3/0683; G06F 16/9024; G06T 1/20; G06T 1/60; G06T 2200/28; G06T 2207/20081
USPC .......................... 706/25, 12, 26, 45; 345/156
See application file for complete search history.

(56) References Cited

U.S. PATENT DOCUMENTS

| | | | |
|---|---|---|---|
| 9,607,355 B2 | 3/2017 | Zou et al. | |
| 9,639,336 B2 | 5/2017 | Grover et al. | |
| 2004/0181562 A1* | 9/2004 | Findeisen | ........... G06F 12/0253 |

(Continued)

OTHER PUBLICATIONS

Aydonat, Utku et al., "An OpenCL Deep Learning Accelerator on Arria 10", FPGA '17, Feb. 22-24, 2017, Monterey, CA, USA, 2017, 10 pages, ACM.

(Continued)

*Primary Examiner* — Thuy N Pardo
(74) *Attorney, Agent, or Firm* — Lewis Roca Rothgerber Christie LLP (57) ABSTRACT

A system and method for memory management. In one embodiment, the method includes generating a dependency structure comprising one or more task identifiers and one or more data object identifiers. The dependency structure includes a list of one or more dependencies for a first data object identifier of the one or more data object identifiers, a first dependency of the list identifying a first task for which a data object identified by the first data object identifier is an input. The method further includes counting the number of dependencies for the first data object identifier, decrementing the count by one when the first task completes execution, and, when the count reaches zero, deallocating the first data object.

22 Claims, 5 Drawing Sheets

(56) References Cited

U.S. PATENT DOCUMENTS

| | | | |
|---|---|---|---|
| 2004/0181782 A1* | 9/2004 | Findeisen | G06F 12/0253 717/130 |
| 2008/0065841 A1* | 3/2008 | Lee | G06F 9/4488 711/E12.006 |
| 2014/0359558 A1* | 12/2014 | Chamberlain | G06F 8/36 717/104 |
| 2016/0314555 A1 | 10/2016 | Zhu et al. | |
| 2016/0335537 A1* | 11/2016 | Spagnola | G06N 3/04 |
| 2016/0379137 A1* | 12/2016 | Burger | G06F 9/46 706/12 |
| 2017/0032487 A1* | 2/2017 | Ashari | G06T 1/20 |
| 2017/0075806 A1* | 3/2017 | Li | G06F 9/5016 |
| 2017/0195621 A1* | 7/2017 | Zhou | H04N 7/012 |
| 2017/0286284 A1 | 10/2017 | Risinger et al. | |
| 2017/0287104 A1 | 10/2017 | Risinger et al. | |
| 2017/0366496 A1* | 12/2017 | Habermehl | G06Q 30/0201 |
| 2018/0276120 A1* | 9/2018 | Vytiniotis | G06F 12/0261 |
| 2018/0293435 A1* | 10/2018 | Wang | G06V 10/32 |
| 2019/0026475 A1* | 1/2019 | Carroll | G06N 5/003 |
| 2019/0138332 A1* | 5/2019 | Bremner | G06F 9/45504 |
| 2019/0171365 A1* | 6/2019 | Power | G06F 3/0649 |
| 2019/0370337 A1* | 12/2019 | Lee | G06N 5/04 |
| 2021/0152385 A1* | 5/2021 | Carroll | G06N 3/02 |
| 2021/0240347 A1* | 8/2021 | Lee | G06F 3/0604 |

OTHER PUBLICATIONS

Diamos, Gregory et al., "Persistent RNNs: Stashing Recurrent Weights On-Chip", Proceedings of the $33^{rd}$ International Conference on Machine Learning, New York, USA, 2016, 10 pages, vol. 48, JMLR: W&CP.

* cited by examiner

MEMORY MANAGEMENT FOR MACHINE LEARNING TRAINING ON GPU

CROSS-REFERENCE TO RELATED APPLICATION(S)

The present application claims priority to and the benefit of U.S. Provisional Application No. 62/625,530, filed Feb. 2, 2018, entitled "MEMORY MANAGEMENT FOR MACHINE LEARNING TRAINING ON GPU", the entire content of which is incorporated herein by reference.

FIELD

One or more aspects of embodiments according to the present invention relate to memory management, and more particularly to a system and method for managing memory for machine learning.

BACKGROUND

Machine learning, when performed on a graphics processing unit (GPU), may be subject to a performance bottleneck related to GPU memory. As a result, performance may be affected by memory needlessly remaining allocated to certain data objects when those data objects are no longer needed for computations that remain to be performed.

Thus, there is a need for an improved system and method of memory management.

SUMMARY

According to an embodiment of the present invention there is provided a method for memory management, including: generating a dependency structure including one or more task identifiers and one or more data object identifiers, the dependency structure including a list of one or more dependencies for a first data object identifier of the one or more data object identifiers, a first dependency of the list identifying a first task for which a first data object identified by the first data object identifier is an input; determining a count, the count being a number of dependencies for the first data object identifier; determining that the first task completed execution; decrementing the count by one based at least in part on determining that the first task completed execution; determining that the count is less than a first threshold; and deallocating the first data object based at least in part on determining that the count is less than the first threshold.

In one embodiment, the first threshold is one.

In one embodiment, the method includes determining a number of dependencies associated with the first task.

In one embodiment, the first task is a compute operation in a first layer of a neural network.

In one embodiment, the first data object is an activation in the first layer.

In one embodiment, the first task includes, during a backward pass: computing a gradient in the activation; and computing a gradient in a weight.

In one embodiment, the first data object is a gradient for input in the first layer.

In one embodiment, the first task includes, during a backward pass: computing a gradient in an activation; and computing a gradient in a weight.

In one embodiment, the first data object is a gradient for weight in the first layer.

In one embodiment, the first task includes performing an in-place update of a weight corresponding to the gradient for weight.

In one embodiment, the method includes: generating a list of zero or more pass-persistent data object identifiers, a first pass-persistent data object identifier identifying a first data object in a neural network; determining that a backward pass is completed; and deallocating the first data object based on determining that the backward pass is completed.

In one embodiment, the first data object is an activation for a first layer of a neural network.

In one embodiment, the method includes: generating a list of zero or more training-persistent data object identifiers, a first pass-persistent data object identifier identifying a first data object in a neural network, determining that training of the neural network is completed, and deallocating the first data object based on determining that training of the neural network is completed.

In one embodiment, the first data object is a weight in a first layer of a neural network.

According to an embodiment of the present invention there is provided a system for machine learning, the system including: a graphics processing unit, and a memory connected to the graphics processing unit, the graphics processing unit being configured to: invoke a no reuse detector; and launch a graphics processing unit kernel, after invoking the no reuse detector, the no reuse detector being configured to: identify a first data object having a persistence defined at least by one or more tasks for which the data object is an input; generate a dependency structure including: a first data object identifier identifying the first data object, and a first task, of the one or more tasks for which the data object is an input; determine a count, the count being a number of dependencies for the first data object identifier; determine that the first task completed execution; decrement the count by one based at least in part on determining that the first task completed execution; determine that the count is less than a first threshold; and deallocate the first data object based at least in part on determining that the count is less than the first threshold.

In one embodiment, the first threshold is one.

In one embodiment, the first task is a compute operation in a first layer of a neural network.

In one embodiment, the first data object is an activation in the first layer.

In one embodiment, the first task includes, during a backward pass: computing a gradient in the activation; and computing a gradient in a weight.

According to an embodiment of the present invention there is provided a method for machine learning, the method including: allocating memory for a first data object in a neural network; determining that the first data object has a persistence defined at least by one or more tasks for which the first data object is an input; determining that a last one of the one or more tasks for which the first data object is an input has completed execution; deallocating the first data object based on determining that the last one of the one or more tasks for which the first data object is an input has completed execution, and based on determining that the first data object has a persistence defined at least by one or more tasks for which the first data object is an input.

In one embodiment, the method includes allocating memory for a second data object in the neural network; determining that the second data object has a persistence defined by completion of a backward pass; and deallocating the second data object at a completion of the backward pass, based on determining that the second data object has a persistence defined by the completion of the backward pass.

In one embodiment, the method includes allocating memory for a third data object in the neural network; determining that the second data object has a persistence defined by completion of training of the neural network; and deallocating the second data object at a completion of training of the neural network, based on determining that the second data object has a persistence defined by completion of training of the neural network.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of exemplary embodiments of a system and method for managing memory for machine learning provided in accordance with the present invention and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In some related art systems, memory is allocated for data objects during machine learning training and the data objects persist until they are freed, and some of the data objects are cached in GPU memory. Once the GPU memory reaches at its maximum capacity, the system migrates the data objects allocated on the GPU to system memory with the page granularity at the operating system (OS) level. Such an approach may result in a loss of performance.

For machine learning (ML) operations on a GPU, a performance bottleneck may be caused by limited GPU memory. Accordingly, some embodiments provide large memory to GPUs for efficient machine learning training by utilizing slower but larger memory with fast GPU memory.

Figure 1:
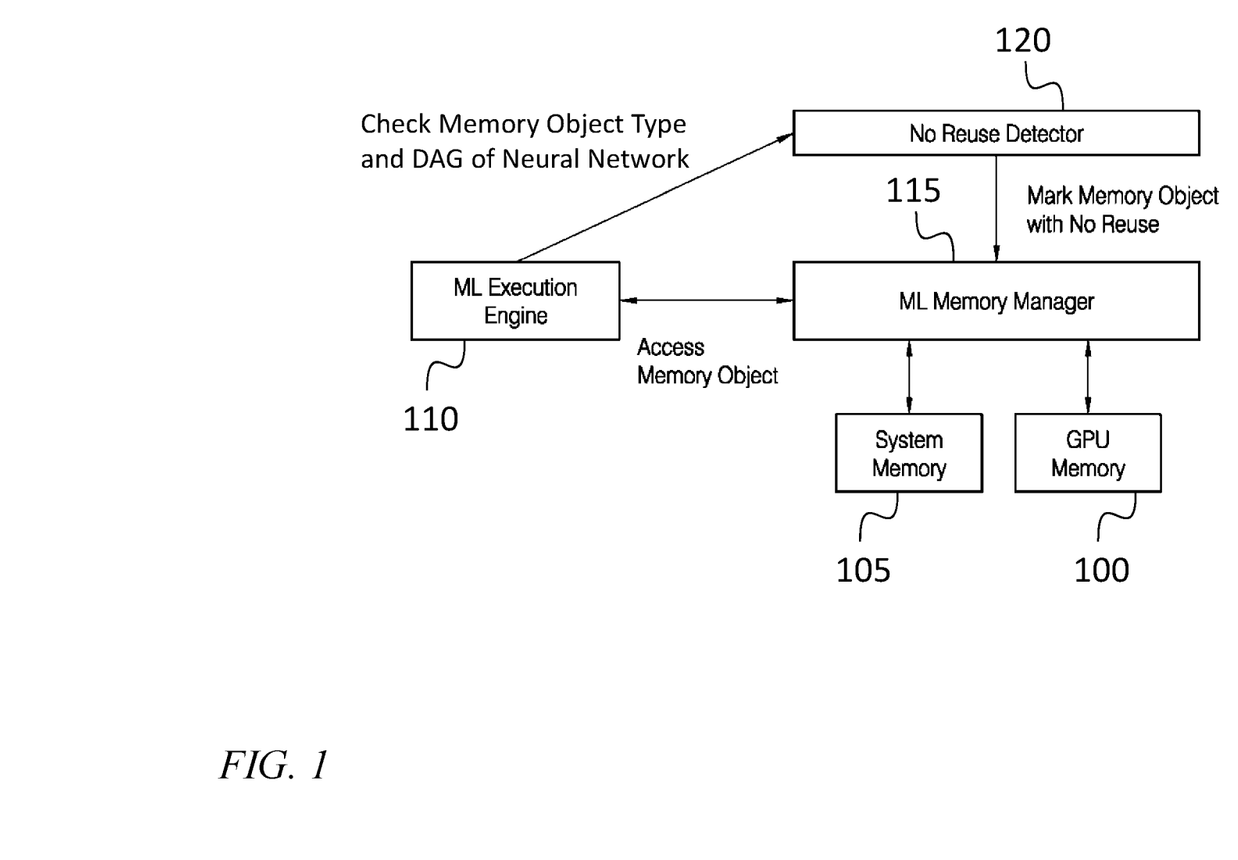
FIG. 1 is a flow diagram, according to an embodiment of the present invention.

FIG. 1 shows the overall flow of some embodiments utilizing both fast GPU memory 100 and slow system memory 105 on the host to provide large memory to GPUs. Such an embodiment may include a machine learning execution engine 110, a machine learning memory manager 115, and a no reuse detector 120. The machine learning execution engine 110 executes the GPU code and accesses the data objects by invoking the machine learning memory manager 115. The machine learning memory manager 115 may be a slab based user level memory management engine, which manages data objects that are accessed by GPU code executed by the machine learning execution engine 110. The no reuse detector 120 differentiates data objects depending on data object types (or "categories", as discussed in further detail below), and marks data objects that do not need to persist by checking the directed acyclic graph (DAG) of the neural network, so that the machine learning memory manager 115 can deallocate these data objects. The invocation of the no reuse detector 120 is performed by the machine learning execution engine 110 after executing each GPU code.

In some embodiments the no reuse detector mentioned above takes advantage of the characteristics of machine learning training and alleviates the performance-critical inefficiency of requesting needlessly large DRAM size during machine learning training on the GPU. It identifies and marks data objects with no reuse so that the machine learning memory manager may deallocate these data objects to reduce the data object migration overhead.

Figure 2:
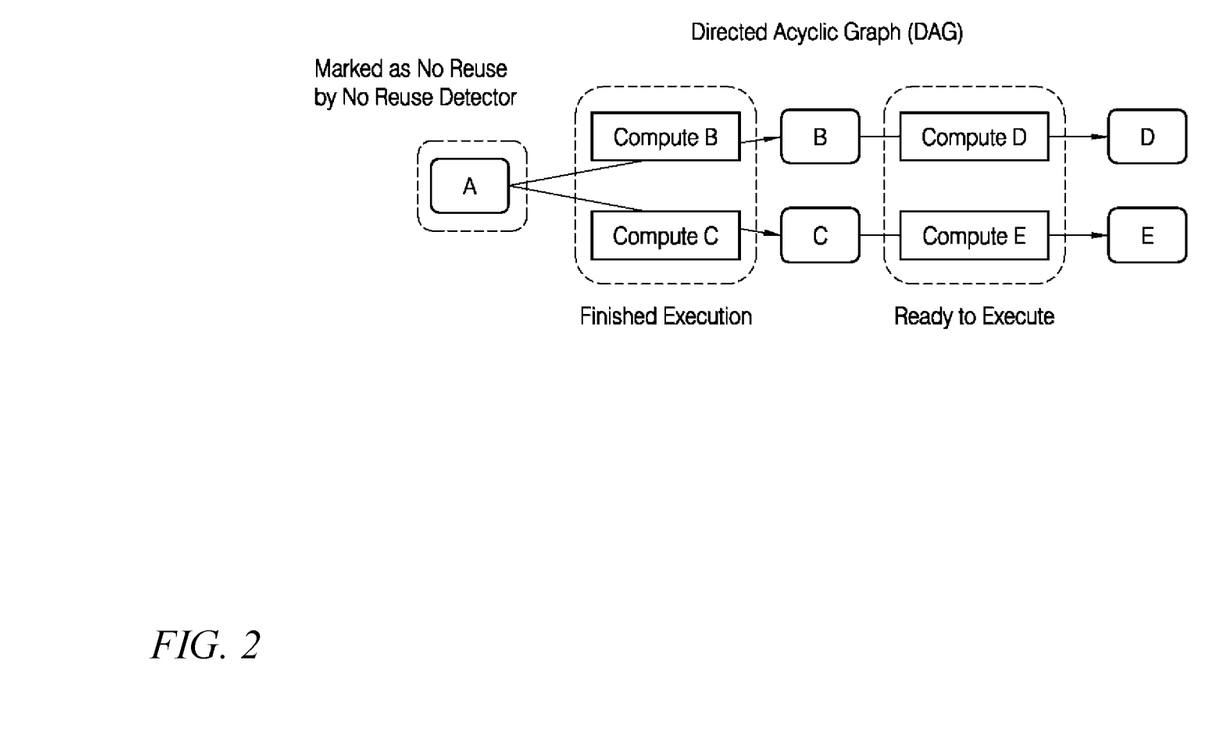
FIG. 2 is a diagram of a directed acyclic graph, according to an embodiment of the present invention.

The no reuse detector checks the directed acyclic graph (DAG) of the neural network to identify the data object with no reuse as in the example illustrated in FIG. 2. FIG. 2 shows, for example, that the computations computing "D" and "E" are ready to execute after computing "B" and "C". In this example, the no reuse detector identifies that there is no further computation (or "task") requiring "A" and marks "A" as "No Reuse" so that it can be deallocated by the machine learning memory manager.

Figure 3:
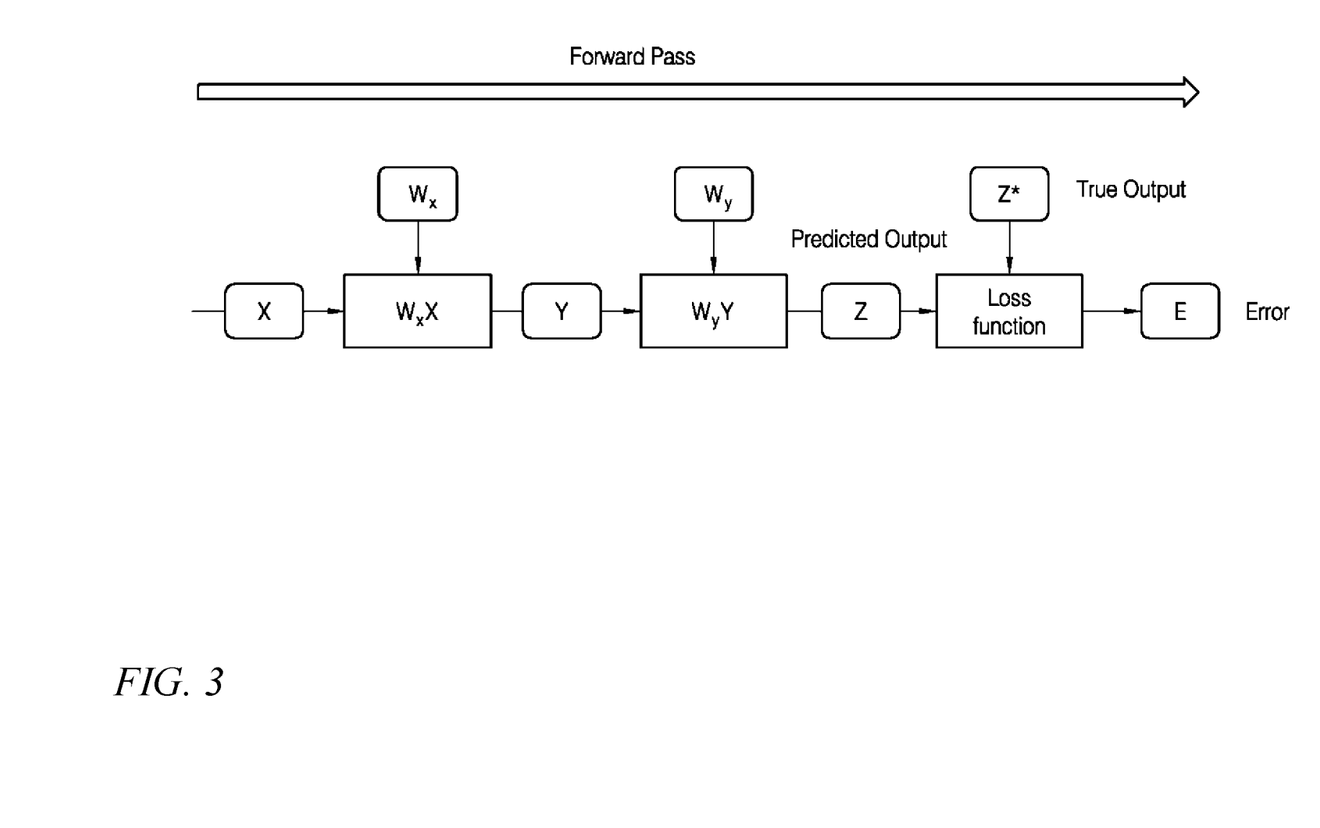
FIG. 3 is a data flow diagram for a forward pass, according to an embodiment of the present invention.
Figure 4:
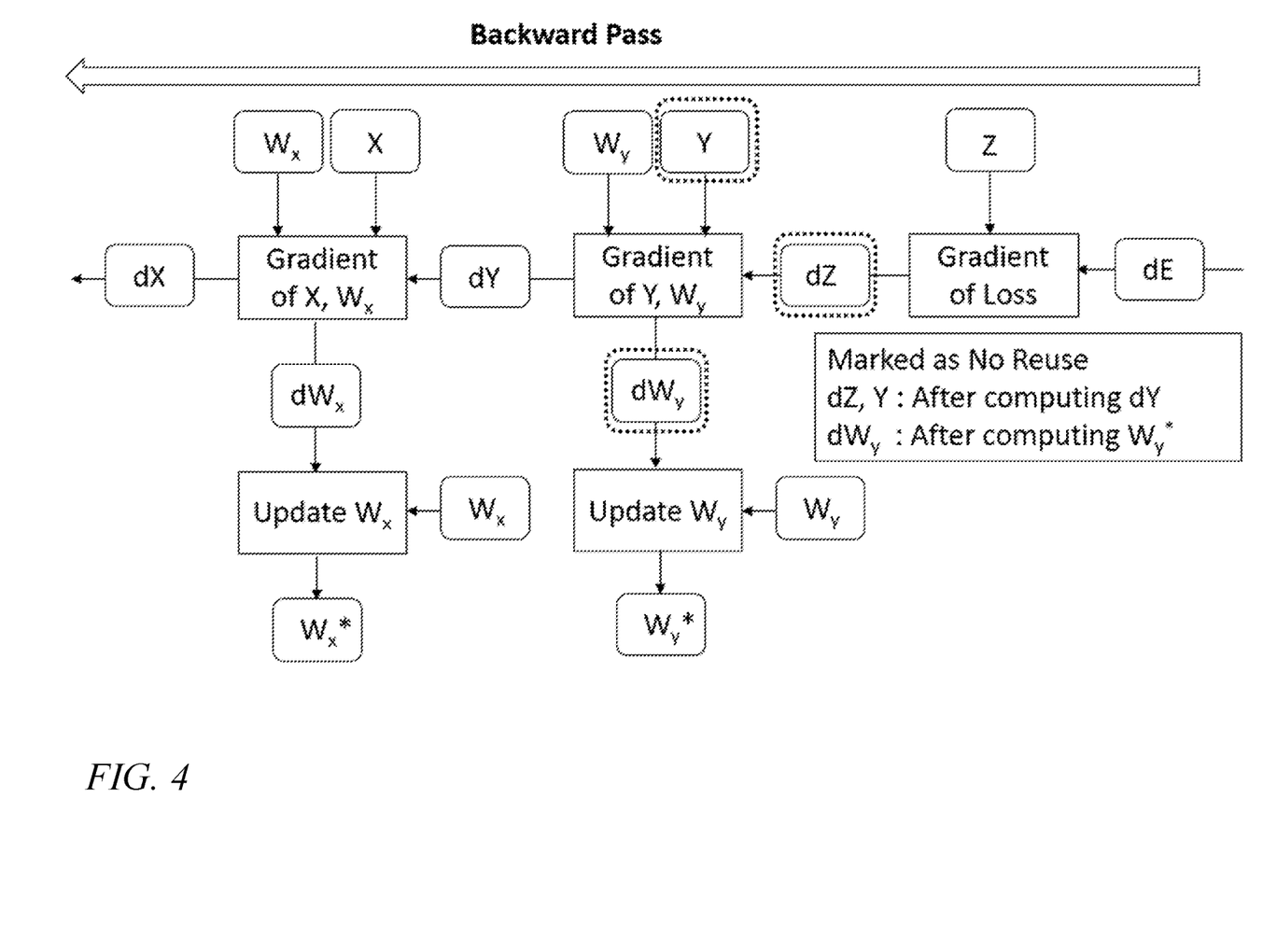
FIG. 4 is a data flow diagram for a backward pass, according to an embodiment of the present invention.

FIG. 3 and FIG. 4 illustrate an example of how a no reuse detector may be used for machine learning training. The computation of each layer of the neural network is executed in sequence: from left to right for a forward pass and from right to left for a backward pass. After the first layer in FIG. 3 computes output "Y" with the input "X" and the weight "$W_x$", the second layer computes "Z" with the input "Y" and the weight "$W_y$". After the predicted output "Z" is computed, the loss function compares "Z" with the true output "Z*" and computes the error "E".

Referring to FIG. 4, the backward pass starts by computing the gradient of loss (or the "gradient for input") "dZ" with the input "Z" and the gradient of error "dE". Then the next layer computes the gradient "dY" and "$dW_y$" with the input "dZ", "Y", and "$W_y$". The computation that performs in-place updating of the weight "$W_y$" into "$W_y$*" is executed when the input "$dW_y$" becomes available. The backward pass for the leftmost layer in FIG. 4 is performed similarly when the gradient "dY" becomes available.

In some embodiments the no reuse detector generates a dependency structure including one or more task identifiers each identifying a respective task (e.g., the task for computing the output "Y" during the forward pass, the task for computing the gradient for input "dZ" during the backward pass, and the task for computing the gradient "dY" in the activation "Y" and the gradient "$dW_y$" in the weight "$W_y$" during the backward pass), and one or more data object identifiers (e.g., identifiers for the data objects that are inputs to the tasks, such as identifiers for "X" and "$W_x$" (for the task for computing the output "Y" during the forward pass), or identifiers for "Y" and "dZ" (for the task for computing the gradient "dY" and the gradient "$dW_y$" during the backward pass)). The dependency structure may link the data object identifiers to the tasks for which they are needed as input. For example, the dependency structure may include a list of one or more dependencies for a first data object identifier (e.g., the identifier for "X"), and a first dependency of the list may identify a first task (e.g., the task for computing the output "Y" during the forward pass) for which the data object ("X") identified by the first data object identifier is an input. The no reuse detector may count the number of dependencies for, e.g., the first data object identifier, decrement the count by one when the first task completes execution, and when the count reaches zero, deallocate the first data object. In this manner, the persistence of the first data object is defined by (or is defined at least by, or is defined at least in part by) one or more tasks for which the first data object is an input.

In this example, the no reuse detector in some embodiments marks the output of each layer during forward pass ("X", "Y", and "Z" in FIG. 3 and FIG. 4) as "No Reuse" during the backward pass by utilizing the characteristic that these data objects are no longer used after using them to compute the gradient ("dX", "dY", and "dZ" in FIG. 4). For example, the data object "Z" is not referenced again after computing the gradient "dZ". The value of "Z" does not need to be maintained for the next iteration (machine learning training processing the next data item), since the value of "Z" at the next iteration does not depend on the value of "Z" at the previous iteration. In some embodiments, the no reuse detector maintains a list of data objects in this category, or "pass-persistent" data objects (i.e., the activations) and marks them as "No Reuse" at the end of the backward pass, so that they are deallocated when the backward pass is completed. The no reuse detector may further maintain a list of "training persistent" data object identifiers, each of which may identify a data object (e.g., a weight, such as "$W_x$") that is to be deallocated only when training is complete.

Figure 5A:
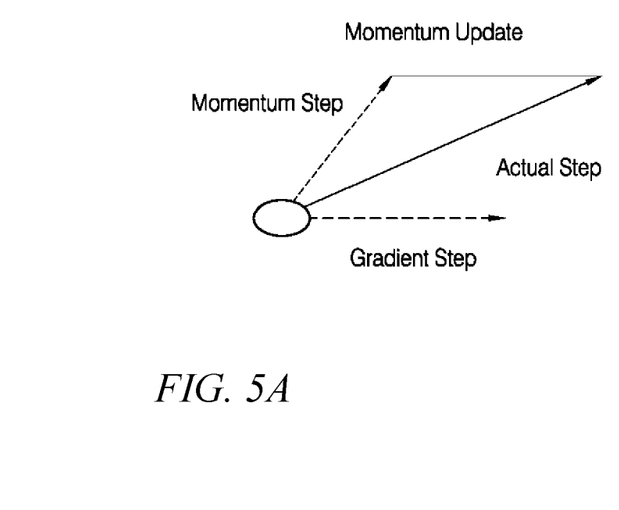
FIG. 5A is a vector sum diagram, according to an embodiment of the present invention.
Figure 5B:
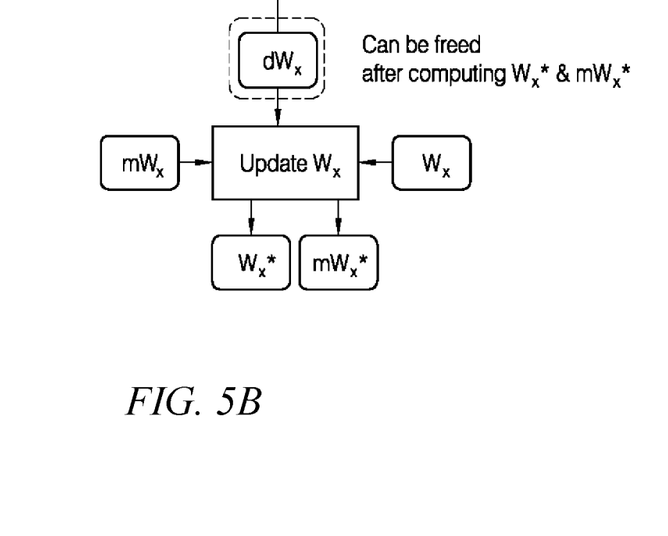
FIG. 5B is a data flow diagram, according to an embodiment of the present invention.

In some embodiments, the no reuse detector also uses the dependency structure to mark the gradient of weights computed during a backward pass ("$dW_x$", "$dW_y$" in FIG. 4) as "No Reuse" after using these data object to update the weights. FIGS. 5A and 5B illustrate an example of weight update using a momentum update. Similar to multiple weight update methods, a momentum update maintains the running average ("$mW_x$" in FIG. 5A) of the gradient of weights ("$dW_x$" in FIG. 5B) and applies the running average to update the weight ("$W_x$" to "$W_x^*$" in FIG. 5B) instead of applying the raw gradient. The raw gradient ("$dW_x$" in FIG. 5B) is no longer needed after computing and performing an in-place update on the weight and the running average. Deallocating the gradient of weights computed during a backward pass and output of forward pass may reduce the memory pressure on GPU memory during machine learning training on a GPU, thus reducing the unnecessary migration between system memory on the GPU and GPU memory.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Although exemplary embodiments of a system and method for managing memory for machine learning have been specifically described and illustrated herein, many modifications and variations will be apparent to those skilled in the art. Accordingly, it is to be understood that a system and method for managing memory for machine learning constructed according to principles of this disclosure may be embodied other than as specifically described herein. The invention is also defined in the following claims, and equivalents thereof.

What is claimed is:

1. A method for memory management, comprising:
allocating memory space for a first data object;
generating a dependency structure comprising one or more task identifiers and one or more data object identifiers, the dependency structure including a list of one or more dependencies for a first data object identifier of the one or more data object identifiers, a first dependency of the list identifying a first task for which the first data object identified by the first data object identifier is an input;
determining a count, the count being a number of dependencies for the first data object identifier;
determining that the first task completed execution;
decrementing the count by one based at least in part on determining that the first task completed execution;
determining that the count is less than a first threshold; and
deallocating the memory space allocated to the first data object based at least in part on determining that the count is less than the first threshold.

2. The method of claim 1, wherein the first threshold is one.

3. The method of claim 1, further comprising determining a number of dependencies associated with the first task.

4. The method of claim 1, wherein the first task is a compute operation in a first layer of a neural network.

5. The method of claim 4, wherein the first data object is an activation in the first layer.

6. The method of claim 5, wherein the first task comprises, during a backward pass:
computing a gradient in the activation; and
computing a gradient in a weight.

7. The method of claim 4, wherein the first data object is a gradient for input in the first layer.

8. The method of claim 7, wherein the first task comprises, during a backward pass:
computing a gradient in an activation; and
computing a gradient in a weight.

9. The method of claim 4, wherein the first data object is a gradient for weight in the first layer.

10. The method of claim 9, wherein the first task comprises performing an in-place update of a weight corresponding to the gradient for weight.

11. The method of claim 1, further comprising:
generating a list of zero or more pass-persistent data object identifiers, a first pass-persistent data object identifier identifying a first data object in a neural network;
determining that a backward pass is completed; and
deallocating the first data object based on determining that the backward pass is completed.

12. The method of claim 11, wherein the first data object is an activation for a first layer of a neural network.

13. The method of claim 1, further comprising:
generating a list of zero or more training-persistent data object identifiers, a first pass-persistent data object identifier identifying a first data object in a neural network,
determining that training of the neural network is completed, and
deallocating the first data object based on determining that training of the neural network is completed.

14. The method of claim 13, wherein the first data object is a weight in a first layer of a neural network.

15. A system for machine learning, the system comprising:
a graphics processing unit, and
a memory connected to the graphics processing unit, the graphics processing unit being configured to:
allocate memory space for a first data object;
invoke a no reuse detector; and
launch a graphics processing unit kernel, after invoking the no reuse detector,
the no reuse detector being configured to:
identify the first data object, the first data object having a persistence defined at least by one or more tasks for which the data object is an input;
generate a dependency structure including:
a first data object identifier identifying the first data object, and
a first task, of the one or more tasks for which the data object is an input;
determine a count, the count being a number of dependencies for the first data object identifier;
determine that the first task completed execution;
decrement the count by one based at least in part on determining that the first task completed execution;
determine that the count is less than a first threshold; and
deallocate the memory space allocated to the first data object based at least in part on determining that the count is less than the first threshold.

16. The system of claim 15, wherein the first threshold is one.

17. The system of claim 15, wherein the first task is a compute operation in a first layer of a neural network.

18. The system of claim 17, wherein the first data object is an activation in the first layer.

19. The system of claim 18, wherein the first task comprises, during a backward pass:
computing a gradient in the activation; and
computing a gradient in a weight.

20. A method for machine learning, the method comprising:
allocating memory for a first data object in a neural network;
determining that the first data object has a persistence defined at least by one or more tasks for which the first data object is an input;
determining that a last one of the one or more tasks for which the first data object is an input has completed execution;
deallocating the memory space allocated to the first data object based on determining that the last one of the one or more tasks for which the first data object is an input has completed execution, and based on determining that the first data object has a persistence defined at least by one or more tasks for which the first data object is an input.

21. The method of claim 20, further comprising allocating memory for a second data object in the neural network;
determining that the second data object has a persistence defined by completion of a backward pass; and
deallocating the second data object at a completion of the backward pass, based on determining that the second data object has a persistence defined by the completion of the backward pass.

22. The method of claim 21, further comprising allocating memory for a third data object in the neural network;

determining that the second data object has a persistence defined by completion of training of the neural network; and deallocating the second data object at a completion of training of the neural network, based on determining that the second data object has a persistence defined by completion of training of the neural network.

\* \* \* \* \*